United States Patent
Eto et al.

[11] Patent Number: 5,592,719
[45] Date of Patent: Jan. 14, 1997

[54] FASTENING CLIP

[75] Inventors: Shinsuke Eto, Kariya; Yositaka Abe, Chiryu; Yuichi Shirase, Toyota, all of Japan

[73] Assignee: Nifco Inc., Yokohama, Japan

[21] Appl. No.: 394,808

[22] Filed: Feb. 27, 1995

[30] Foreign Application Priority Data

Mar. 10, 1994 [JP] Japan .................................. 6-076266

[51] Int. Cl.⁶ .................................................. F16B 19/00
[52] U.S. Cl. .............................. 24/453; 24/297; 411/510
[58] Field of Search ............ 24/297, 453; 411/508–510; 174/138 D

[56] References Cited

U.S. PATENT DOCUMENTS

| | | | |
|---|---|---|---|
| 4,704,059 | 11/1987 | Nakawa et al. | 411/510 X |
| 4,762,437 | 8/1988 | Mitomi | 24/297 X |
| 4,927,300 | 5/1990 | Sato | 411/510 X |
| 4,978,265 | 12/1990 | De Wan | 411/510 X |
| 5,011,356 | 4/1991 | Fernandez | 411/508 X |
| 5,066,237 | 11/1991 | Shiley | 411/508 X |
| 5,319,839 | 6/1994 | Shimajiri | 24/453 |
| 5,373,611 | 12/1994 | Murata | 24/453 X |

*Primary Examiner*—James R. Brittain
*Attorney, Agent, or Firm*—Oblon, Spivak, McClelland, Maier & Neustadt, P.C.

[57] ABSTRACT

A clip includes a head portion, a leg portion extending from an underside of the head portion, reducible-diameter protruding engaging portions provided midway along the length of the leg portion on a peripheral surface thereof, engaging members provided on a part of the peripheral surface of the leg portion and spaced from the protruding engaging portions, the engaging members becoming wider as they extend from an end part of the leg portion toward the underside of the head portion and which are provided at their free end with engaging portions positioned between the protruding engaging portions and the underside of the head portion.

6 Claims, 4 Drawing Sheets

FASTENING CLIP

BACKGROUND OF THE INVENTION

1. Field of the Invention

The present invention relates to a clip used to fasten panels together, for example to attach interior trim panels of an automobile to metal body panels.

2. Description of the Prior Art

Many conventional clips have been designed to attach panels together. Particularly in the case of parts clips formed of synthetic resin, it is considered a matter of course to provide the clips with such a function. While synthetic resin clips are generally one-piece clips, there are also clips consisting of an assembly of a plurality of parts. Most clips are specially shaped depending on where they are to be used. Trim is used to provide a decorative surface covering. As such, when clips are used to attach trim it is desirable that the clips themselves are not visible on the surface. When large trim or other such panels are to be fitted by using a multiplicity of clips, to facilitate the task it is also desirable for the clips to be provisionally inserted in the panels beforehand. This also applies with respect to clips used to attach other parts, but the need is especially strong in the case of large panels, such as trim panels, which have numerous clips that are struck or pressed into engagement to thereby attach the panel.

Conventional clips used to attach trim panels include single-piece clips, and two-piece clips comprised of male and female members that are used to attach panels together by assembling the male and female members. In such a two-piece clip, a hollow body portion of the female member is inserted into a hole formed in a metal body panel where it is held by means of engaging portions provided on the peripheral surface of the body. A shaft extending perpendicularly from the underside of a head portion on the male member is inserted into a hole formed in the trim panel where it is maintained upright. The trim panel is then affixed to the body panel by assembling the male and female members by inserting the shaft into the cavity in the female member.

In the case of single-piece clips, the clip has a leg portion extending perpendicularly from the underside of a head portion shaped like a shallow saucer. The peripheral surface of the leg is provided with protruding or hooked shaped pieces for engagement. The two panels to be affixed are held together and the leg is inserted through holes formed in both panels and locked into engagement by means of the protruding or hooked shaped pieces, thereby clamping the panels together.

Among the advantages of the assembly type clip are that surface exposure can be avoided by affixing the head of the male member to the reverse side of the panel being affixed, the clip can be provisionally attached beforehand to the panel, and panels that have been fitted can be separated by disengaging the male and female members. Drawbacks of this type of clip include that they have to fitted in separate pieces, and that as each of the clips is comprised of two members, they are more costly than single-piece clips and more difficult in terms of product control.

Compared to assembly type clips, single-piece clips are cheaper to manufacture, and product control is also easier, as the clip is in the form of a single piece, which also makes them easier to handle. However, the difficulty of provisionally pre-attaching conventional single-piece clips to trim panels has led to a demand for an single-piece clip that offers improved provisional attachability.

The clip is inserted into a hole formed in a panel to be attached such as a trim panel and provisionally held there by means of protruding engaging portions or members provided on the clip leg, as described above. The trim panel is affixed to a body panel or the like by pushing the leg projecting from the hole in the trim panel into a hole in the body panel, whereby the engaging portions or members on the leg of the clip are moved into the hole in the body panel, thus affixing the panels together.

However, a problem occurs in that when the leg is pushed through into the hole in the panel, the fact that the protruding engaging portions or members are tapered to facilitate the insertion causes a loss of the provisional engagement. This results in a loss of the support needed to be able to insert and anchor the leg in the hole in the body panel. This can be circumvented by directly striking or pushing the head of each clip. However, in practice this can result in a loss of provisional engagement, causing clips to drop out of the panel.

SUMMARY OF THE INVENTION

An object of the present invention is to provide a one-piece clip that can be provisionally affixed to a first panel that is to be attached to a second panel, and, when the first panel is brought into surface contact with the second panel and the clip is thereby inserted into a hole formed in the second panel, maintains the state of provisional affixment at least until engagement in the hole is ensured.

Another object of the present invention is to provide a clip that can be provisionally affixed to a first panel by frontal insertion in a hole formed in the first panel, and which optionally can maintain the provisional affixment until subjected to a special operation.

A further object of the present invention is to provide a clip that facilitates insertion into a hole in a first panel for provisional affixment, and uses increased withdrawal force therefrom to facilitate insertion and engagement into a hole in a second panel.

Yet a further object of the present invention is to provide a clip that can be withdrawn from a second panel to allow the first panel to be disengaged from the second panel, and when withdrawn automatically assumes a state of provisional affixment in the hole of the first panel.

In accordance with the present invention, the above object is attained by a clip comprising a head portion, a leg portion extending from an underside of the head portion, reducible-diameter protruding engaging portions provided midway along the length of the leg portion on a peripheral surface thereof, engaging members provided on a part of the peripheral surface of the leg portion where protruding engaging portions are not provided, said engaging members becoming wider as they extend from an end part of the leg portion toward the underside of the head portion and having at a free end thereof engaging portions positioned between the protruding engaging portions and the underside of the head portion.

The present invention also provides a clip in which the substantial outside diameter of the engaging portions provided at the free end of the engaging portions exceeds the substantial outside diameter of the protruding engaging portions. The invention further comprises a clip in which the protruding engaging portions are a pair arranged back to back, one on each side of the leg axis, and the engaging members are a pair, one on each side of the leg axis, said engaging members each being fan-shaped and provided away from the protruding engaging portions. The invention also comprises a clip having an umbrella-shaped head portion that is made thin to impart flexibility. The invention also comprises a clip in which the leg portion is formed by two plate members arranged at right-angles to each other to form a configuration having a cross-shaped section, said plate members being tapered at their lower end and provided with a protruding engaging portion and engaging member disposed symmetrically at each side.

The clip according to this invention is used to fasten two panels together by inserting the clip into holes formed in each panel. Specifically, when the leg of the clip is inserted into the first panel until the underside of the head is in contact with the surface of the panel, engaging members on the leg are contracted by contact with the edge of the hole. When they emerge from the hole on the other side of the panel, the engaging members expand and the engaging portions at the free ends of the engaging members provisionally affix the clip in place.

To attach the panels together, the leg portion protruding from the rear surface of the first panel is inserted into the hole in the second panel. The protruding engaging portions are contracted as they are forced through the hole, and as they clear the hole flex outward into their original configuration, lock the clip in place in the hole of the second panel to thereby clamp the panels together. The engaging members maintain the provisional engagement in the first panel until the protruding engaging portions have passed through the hole in the second panel, preventing the clip from being pushed back out of the first panel. The provisional engagement ends when the engaging members reach the hole in the second panel and are thereby flexed inward.

The clip can be disengaged, such as to allow the panels to be separated, for example. This is done by exerting a force in the direction of clip withdrawal. The protruding engaging portions are thus again forciby flexed inwards by the hole, allowing the clip to be withdrawn and the panels to be separated. Withdrawing the clip from the hole in the second panel allows the engaging members to flex back out to their original position, returning the clip to its provisional engagement in the first panel.

Further features of the invention, its nature and various advantages will be more apparent from the accompanying drawings and following detailed description of the invention.

DESCRIPTION OF THE PREFERRED EMBODIMENT

Figure 1:
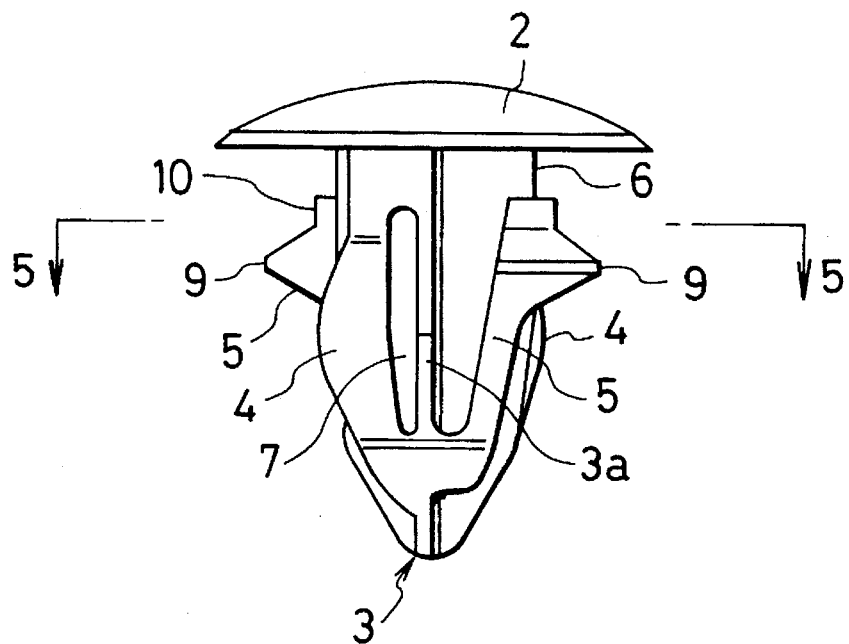
FIG. 1 is a front view of an embodiment of the clip of this invention.
Figure 2:
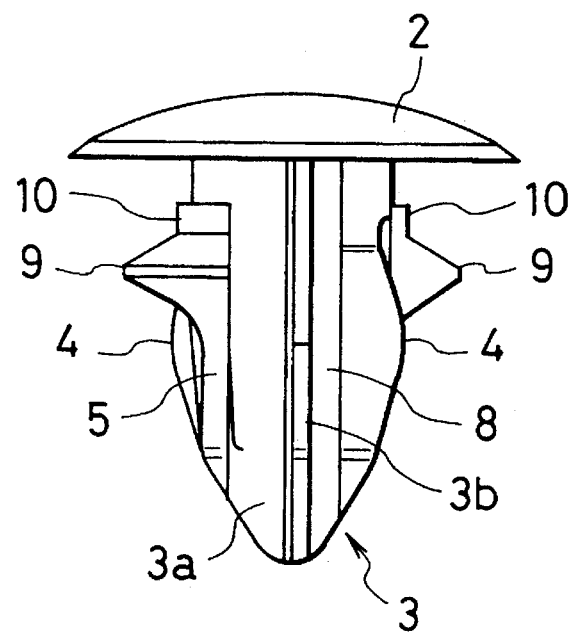
FIG. 2 is a right-side view of the clip of FIG. 1.

The drawings illustrate a clip used to attach an interior trim to a car. In the drawings, reference numeral 1 denotes a trim clip, 2 is the head part of the clip, 3 is a leg, 4 are protruding engaging portions formed on the peripheral surface of the leg and 5 are engaging members that jut out from the outer surface of the leg. The head 2 prevents the clip passing right through a hole 21a formed in a trim panel 21 being attached. The head 2 is shaped like a round, shallow umbrella. The leg 3 extends from the underside of the head 2 and is designed to be inserted through the trim panel hole 21a and into a hole 22a formed in a metal body panel 22 of a car. The leg 3 is made long enough for the end to clear the trim panel 21 and body panel 22 when the two panels are in surface contact. The diameter of the top 6 of the leg 3 is smaller than the inside diameter of the holes 21a and 22a to allow it to be accommodated in the holes 21a and 22a. Two plate members 3a and 3b disposed at right-angles to each other in a configuration having a cross-shaped section are provided to facilitate the integral formation of the leg portion itself together with the protruding engaging portions 4 and engaging members 5. A protruding engaging portion 4 is formed on one side, and an engaging member 5 on the other side, of each end of the plate member 3a. At the top end the plate members 3a and 3b have the same width and their edges are arranged in parallel, constituting the top 6 of the leg. From partway along their length, the width of the plate members 3a and 3b is gradually reduced toward the tip to facilitate insertion.

Figure 3:
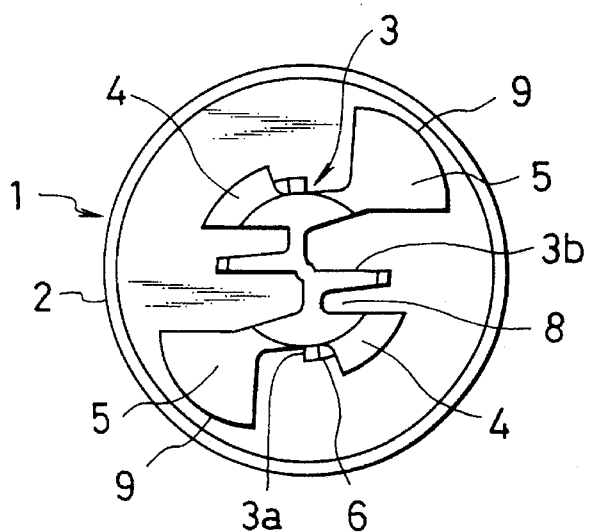
FIG. 3 is a bottom view of the clip of FIG. 1.
Figure 5:
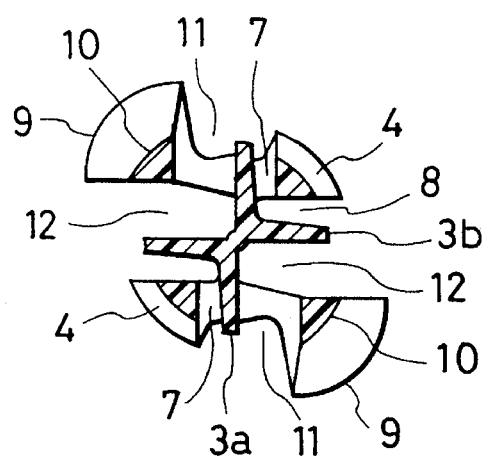
FIG. 5 is a plan cross-sectional view along line 5—5 of FIG. 1.

The protruding engaging portions 4 form an expanded diameter portion at a center part of the leg 3, swelling outward from one surface at each end of the plate member 3a, as shown by FIGS. 3 and 5. Divisions 7 are formed between the center of the expanded portion and the plate member 3a. These divisions 7 allow the protruding engaging portions 4 to contract by flexing inwards. Each of the protruding engaging portions 4 is separated from plate member 3b by a space 8 to prevent plate member 3b from blocking the inward contraction of the portions 4. Each of the protruding engaging portions 4 expands horizontally outward, giving it a fan-shaped horizontal cross-section with a curved peripheral surface; the protruding engaging portions 4 are symmetrically opposed at each side of the plate member 3a. The protruding engaging portions 4 are arranged so that they can be accommodated within a single circumference, and form the substantial diameter of the leg.

Engaging members 5 are provided on the plate member 3a on the opposite side to the protruding engaging portions 4. As shown, in this embodiment each of the engaging members 5 starts near the tip of the plate member 3a and gradually expands as it extends upwards toward the head 2, and near the free end thereof is provided on its outer surface with a jutting, peak-shaped engaging portion 9. The engaging portions 9 are located above the apex of the protruding engaging portions 4 in opposition to the underside of the head 2, and are provided with a projection 10 that engages in the hole 21a. The engaging members 5 are provided at each end of the plate member 3a in symmetrical opposition across the axis of the leg.

Figure 4:
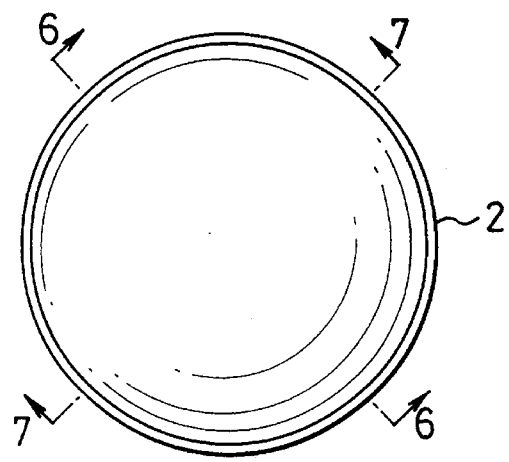
FIG. 4 is a plan view of the clip of FIG. 1.

As shown, the engaging portions 9 project further out than the protruding engaging portions 4 and are spaced equidistantly from the plate members 3a and 3b constituting the leg 3 by spaces 11 and 12. The spaces 11 and 12 provide room for flexing. One of the reasons for using the plate members 3a and 3b to constitute the leg 3 is to provide these spaces. The clip 1 thus configured is integrally formed of a thermoplastic synthetic resin that provides the clip with a suitable degree of stiffness and flexibility. The panels are clamped together by inserting the clip into the holes 21a and 22a formed in the panels 21 and 22. This arrangement will now be described with reference to FIGS. 6 to 9 showing longitudinal cross-sections through the center of the clip, along line 6—6 of FIG. 4 in the case of FIGS. 6 and 8, and along line 7—7 of FIG. 4 in the case of FIGS. 7 and 9.

Figure 6:
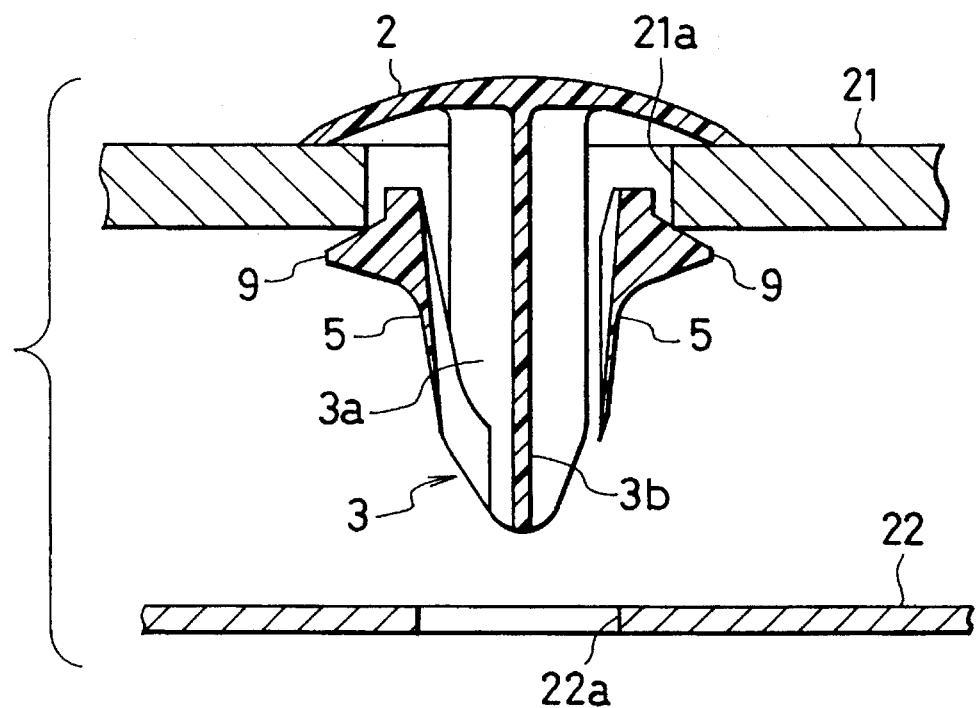
FIG. 6 is a longitudinal cross-sectional view, along line 6—6 of FIG. 4, of the clip provisionally engaged in a first panel hole.

In FIG. 6 the leg 3 has been inserted into the hole 21a until the underside of the head 2 is against the panel surface. When the leg 3 is pushed in the engaging members 5 are contracted by the hole 21a When they emerge at the other side, the engaging members 5 expand, locking portions 9 into engagement against the edge of the hole. This engagement of the members 5 with the hole 21a establishes a state of provisional attachment that prevents the clip from coming out of the hole. In the example of this embodiment, provisional engagement is provided by the engaging portions 9. With thin panels, the projection 10 serves to produce stable engagement.

Figure 7:
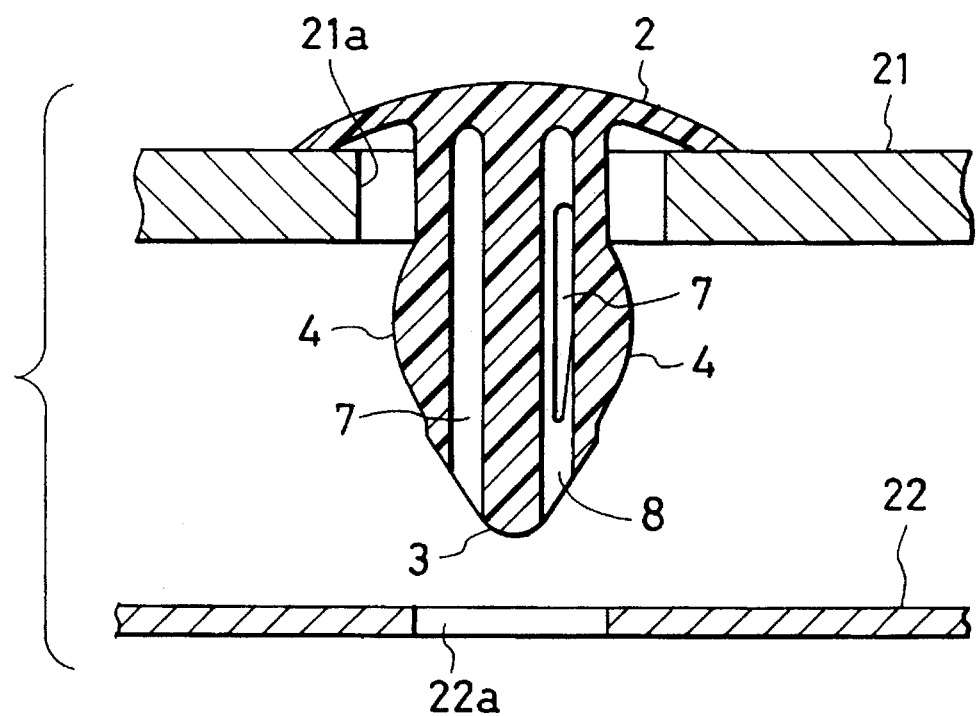
FIG. 7 is a longitudinal cross-sectional view, along line 7—7 of FIG. 4, of the clip provisionally engaged in a first panel hole.
Figure 8:
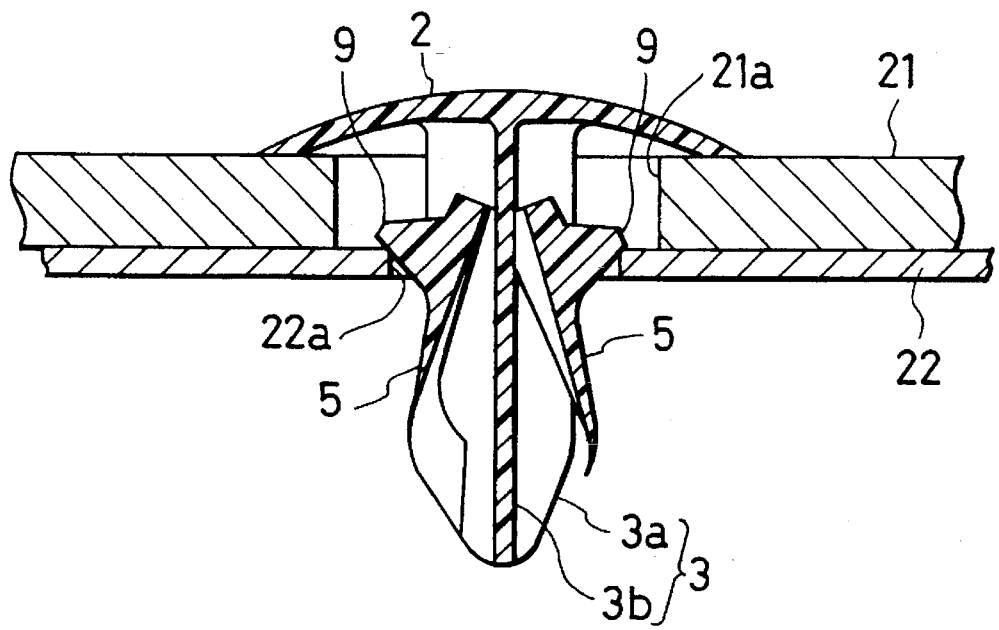
FIG. 8 is a longitudinal cross-sectional view, along line 6—6 of FIG. 4, showing the fully-locked clip.
Figure 9:
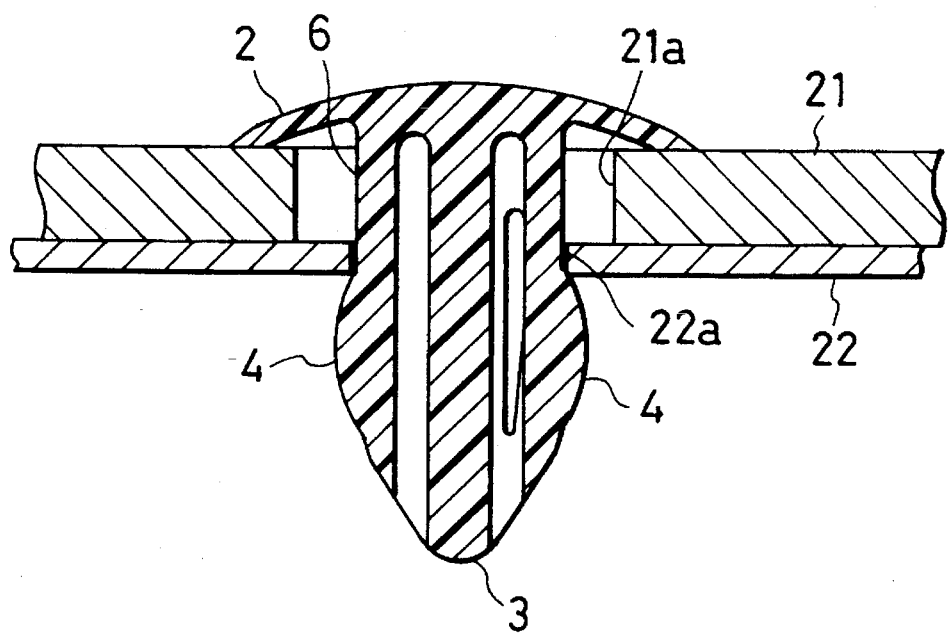
FIG. 9 is a longitudinal cross-sectional view, along line 7—7 of FIG. 4, showing the fully-locked clip.

FIG. 7 illustrates the provisional engagement of the engaging members 5 in the hole 21a, as seen from another aspect of the leg 3 that shows the protruding engaging portions 4. Here, the portions 4 can pass through to the rear side of the trim panel 21 unaffected by the hole 21a. In practice, trim panels are attached using a plurality of clips. For this, it is to be understood that a clip will be provisionally engaged in each of a plurality of holes. FIGS. 8 and 9 show when a clip 1 that has been provisionally engaged in a trim panel 21 is then fully affixed by being inserted into the hole 22a of a metal body panel 22. This is done by striking or pushing the head 2 to force the leg 3 projecting from the trim panel 21 into the hole 22a. The protruding engaging portions 4 are contracted as they pass through the hole 22a to lock into engagement with the edge of the hole 22a.

FIG. 9 shows the trim panel 21 affixed to the body panel 22, with the portions 4 locked into position against the rim of the hole 22a. The pressure exerted by the protruding engaging portions 4 trying to spring back to their original position increases the strength of the union between the panels. With reference to FIG. 8, as the engaging members 5 are contracted by their entry into hole 22a the engaging portions 9 enter the hole 21a, ending the provisional engagement. The trim panel 21 is attached to the body panel 22 when the clip provisionally maintained in the trim panel 21 is pushed into the hole 22a of the body panel 22 and locked in place by the protruding engaging portions 4. The trim panel 21 can be detached by pulling it away from the body panel 22, causing disengagement and withdrawal of the protruding engaging portions 4 from the hole 22a.

As described in the above, the presence of divisions 7 and spaces 8 allows the protruding engaging portions 4 to flexibly contract inwards when subjected to outside pressure. The longitudinal curvature of these portions along the leg 3 facilitates contraction, disengagement and withdrawal when the clip is forcefully pulled. When the engaging members 5 are released from the confinement of the hole 22a and open out, the protruding engaging portions 4 are withdrawn from the hole 22a and the clip is again provisionally affixed in the hole 21a of trim panel 21 by the engagement of portions 9. If required, the clip can of course be removed from the trim panel 21 by manually pushing in the engaging members 5 to disengage the engaging portions 9.

In accordance with the above description, first the clip is provisionally inserted into the trim panel, and then into the metal body panel. However, the panels can also be affixed together by placing one panel against the other so that the holes 21a and 22a are aligned, and then inserting the clip into the holes. While this omits the provisional engagement, when the clip is withdrawn from the hole 22a to separate the panels, it remains provisionally engaged by means of the engaging members 5.

In the arrangement of the above-described embodiment the hole 22a in the body panel 22 is larger than the hole 21a in the trim panel 21 so that the protruding engaging portions 4 can smoothly pass through the hole 21a when the clip 1 is being provisionally mounted in the hole. Accordingly, it is preferable for the hole 21a to be larger than the substantial diameter of the protruding engaging portions 4. Conversely, for the purpose of engagement the hole 22a should have a smaller diameter than that of the protruding engaging portions 4. In the transition from provisional to full engagement, providing the hole 21a with a large diameter also enables the engaging portions 9 to be accommodated therein so that they do not obstruct surface contact between the panels.

As described in the foregoing, the clip according to this invention has a leg provided with engaging members for attachment to a first panel, and protruding engaging portions for attachment to a second panel. The engaging members are used to provisionally attach the clip to the first panel while the protruding engaging portions are used to fully secure the clip in the second panel to thereby fix the panels together.

The panels can be separated by forcibly pulling the leg contracts the protruding engaging portions, allowing the leg to be withdrawn from the second panel. Even when the leg is thus withdrawn from the second panel, the clip is still provisionally maintained in the first panel. As the clip is used by inserting it into panel holes from the front, it offers good efficiency. Also, the protruding engaging portions and engaging members are each provided independently of the other and therefore can function without any mutual interference, ensuring precise provisional and full attachment.

What is claimed is:

1. A clip comprising a head portion, a leg portion extending from an underside of the head portion, reducible-diameter protruding engaging portions provided midway along the length of the leg portion on a peripheral surface thereof, engaging members provided on a part of the peripheral surface of the leg portion and spaced from said engaging portions, said engaging members becoming wider upon extending from an end part of the leg portion toward the underside of the head portion and having at a free end thereof additional peak-shaded engaging portions positioned between the protruding engaging portions and the underside of the head portion.

2. A clip according to claim 1, wherein the outside diameter of the additional engaging portions provided at the free end of the engaging members is larger than the outside diameter of the protruding engaging portions.

3. A clip according to claim 1, wherein the protruding engaging portions comprise two protruding engaging portions arranged back to back, one on each side of the leg axis, and the engaging members comprise two engaging members, one on each side of the leg axis, said engaging members being fan-shaped and positioned away from the protruding engaging portions.

4. A clip according to claim 1, wherein said head portion comprises a thin, umbrella-shaped head portion which is flexible.

5. A clip according to claim 1, wherein the leg portion comprises two plate members arranged at right-angles to each other to form a configuration having a cross-shaped section, said plate members being tapered at their lower end and each being located between said one of said protruding engaging portions and one of said engaging members.

6. A clip according to claim 5, wherein said peak-shaped engaging portions are spaced equidistantly from said plate members.

* * * * *